(12) United States Patent
Coffey

(10) Patent No.: US 6,648,787 B1
(45) Date of Patent: Nov. 18, 2003

(54) TRACTION DRIVE TRANSMISSION

(75) Inventor: Dan Coffey, Howell, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/154,370

(22) Filed: May 23, 2002

(51) Int. Cl.[7] .............................................. F16H 37/02
(52) U.S. Cl. ...................................... 475/216; 475/215
(58) Field of Search ................................. 475/215, 216

(56) References Cited

U.S. PATENT DOCUMENTS

| | | | |
|---|---|---|---|
| 5,607,372 A | 3/1997 | Lohr | ........................... 475/216 |
| 6,059,685 A | 5/2000 | Hoge et al. | .................. 475/214 |
| 6,358,178 B1 * | 3/2002 | Wittkopp | ..................... 475/207 |
| 6,561,942 B2 * | 5/2003 | Wehking | ..................... 475/216 |

* cited by examiner

Primary Examiner—Dirk Wright
(74) Attorney, Agent, or Firm—Leslie C. Hodges

(57) ABSTRACT

A traction drive transmission that operates in a geared neutral condition includes coaxial input and output shafts and a traction drive unit connected to the input shaft. A first gearset has a first carrier attached to the input shaft and the drive unit, a first sun gear attached to the drive unit, and a first ring gear. A second gearset has a second sun gear, a second carrier attached to the first ring gear and a second ring gear attached to the first carrier. A third gearset has a third sun gear attached to the second sun gear, a third carrier and a third ring gear. A first clutch is operative to drivably connect the second carrier and one of the output shaft and the third carrier. A second clutch is operative to brake one of the third carrier and the third ring gear.

6 Claims, 4 Drawing Sheets

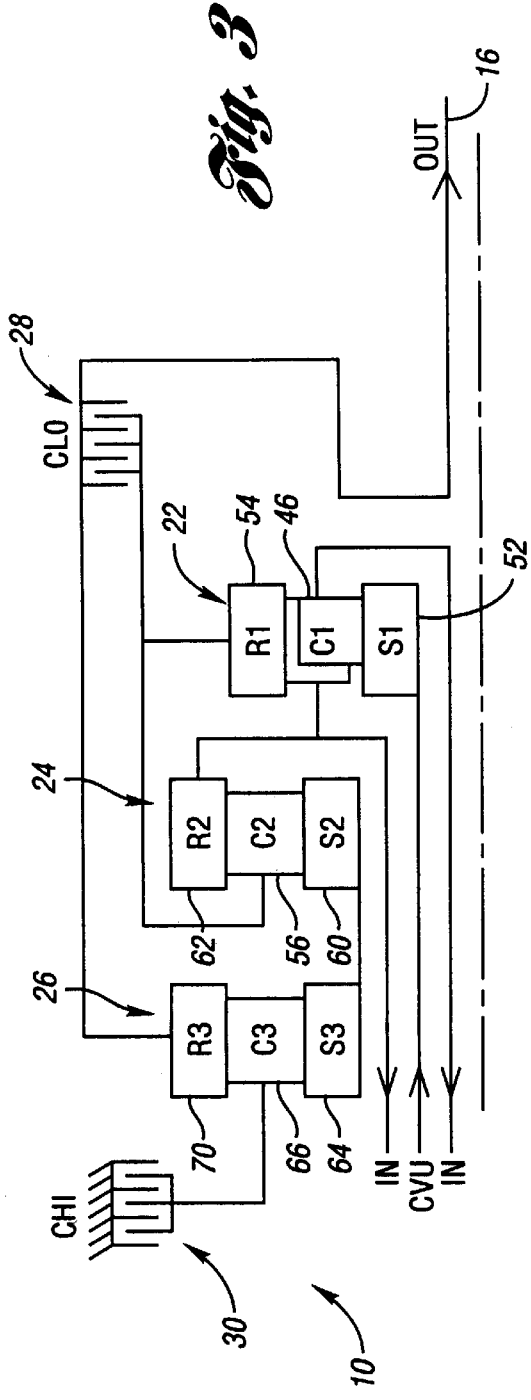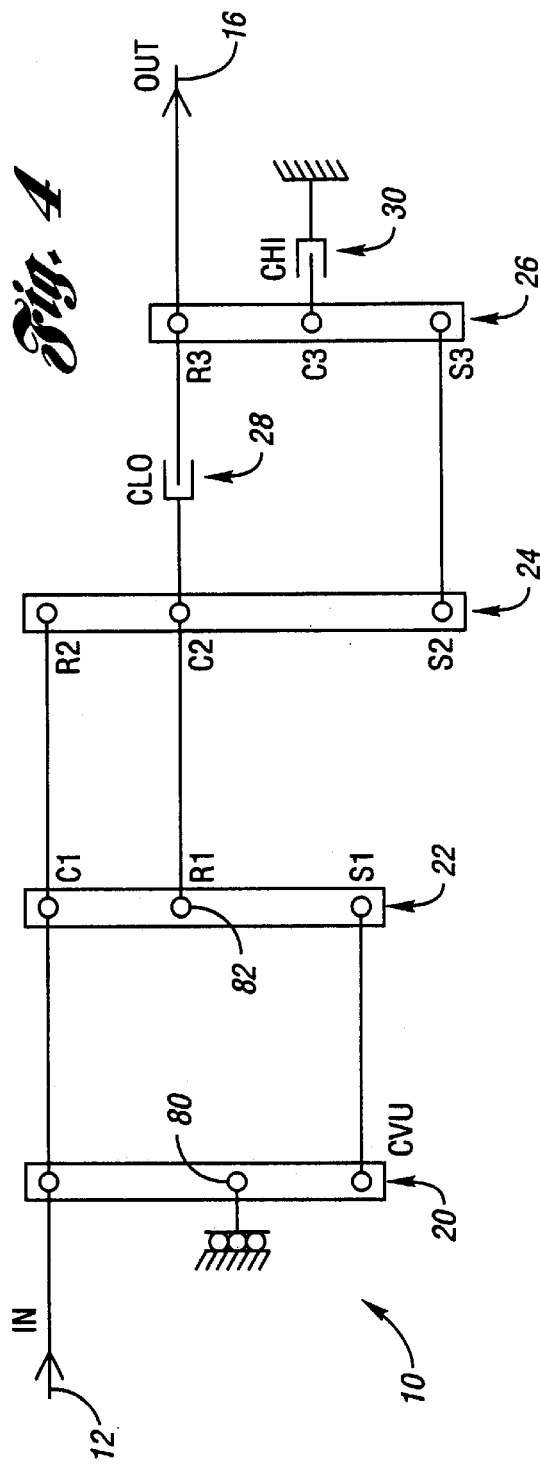

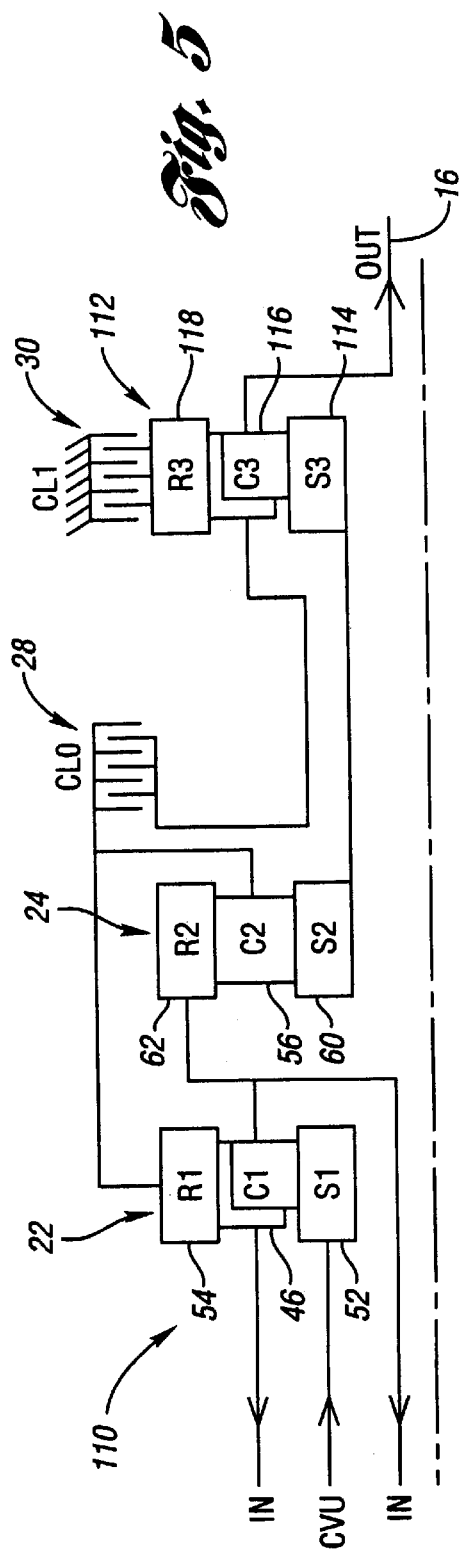
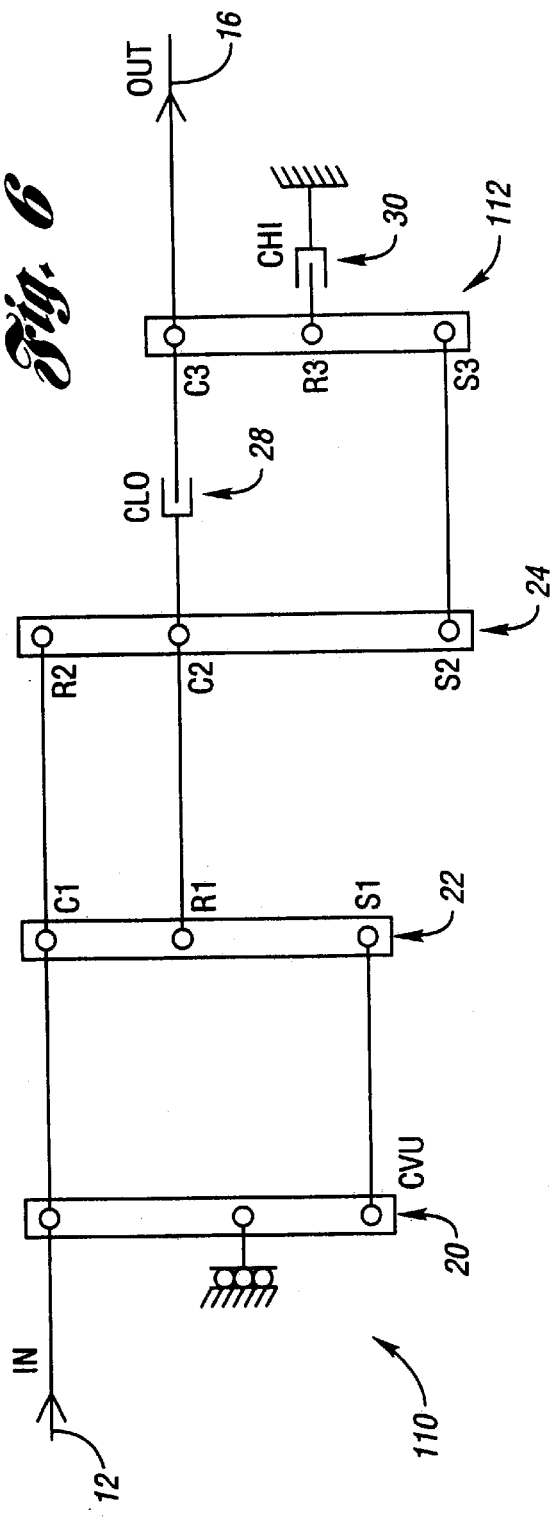

US 6,648,787 B1

TRACTION DRIVE TRANSMISSION

TECHNICAL FIELD

The invention relates to a transmission having a traction drive continuously variable unit, and more particularly to such a transmission that is configured to achieve geared neutral operation.

BACKGROUND OF THE INVENTION

U.S. Pat. No. 5,607,372 discloses a transmission that includes a traction drive continuously variable unit and that is configured to achieve geared neutral operation. This transmission, however, includes a Ravigneaux gearset including a long pinion that contacts two sun gears. Such a gearset may be difficult to manufacture and assemble. Furthermore, this gearset does not scale well for high torque values.

SUMMARY OF THE INVENTION

The invention addresses the shortcomings of the prior art by providing a transmission that is configured to achieve geared neutral operation using a traction drive continuously variable unit, but without using a Ravigneaux gearset.

Under the invention, a traction drive transmission includes coaxial input and output shafts and a traction drive continuously variable unit that is connected to the input shaft. The transmission further includes first, second and third gearsets and first and second clutches.

The first gearset is a compound planetary gearset including a first sun gear attached to the continuously variable unit, and a first carrier having a first carrier body attached to the input shaft and the continuously variable unit. The first carrier further has first and second planet pinions rotatably supported by the first carrier body. The first planet pinion meshes with the first sun gear, and the second planet pinion meshes with the first planet pinion. The first gearset further includes a first ring gear that meshes with the second planet pinion. The second gearset has a second carrier attached to the first ring gear, a second ring gear attached to the first carrier body, and a second sun gear. The third gearset has a third sun gear attached to the second sun gear, a third carrier, and a third ring gear. The first clutch is movable between an engaged position, for drivably connecting the second carrier and one of the output shaft and the third carrier, and a disengaged position for disconnecting the second carrier from the one of the output shaft and the third carrier. When the first clutch is in the engaged position, torque supplied by the input shaft is transferred from the first ring gear to the output shaft. The second clutch is movable between an engaged position, for braking one of the third carrier and the third ring gear, and a disengaged position for releasing the one of the third carrier and the third ring gear. When the second clutch is in the engaged position and the first clutch is in the disengaged position, torque supplied by the input shaft is transferred through the third sun gear, then through the other of the third carrier and the third ring gear to the output shaft. Furthermore, the transmission is operative to maintain the output shaft in a stationary position when the input shaft is rotated in a first direction and the first clutch is in the engaged position.

BRIEF DESCRIPTION OF THE DRAWINGS

FIG. 3 is a schematic representation of the transmission;

FIG. 4 is a lever diagram of the transmission;

FIG. 5 is a schematic representation of a second embodiment of the transmission; and FIG. 6 is a lever diagram of the second embodiment of the transmission.

DESCRIPTION OF THE PREFERRED EMBODIMENT

Figure 1:
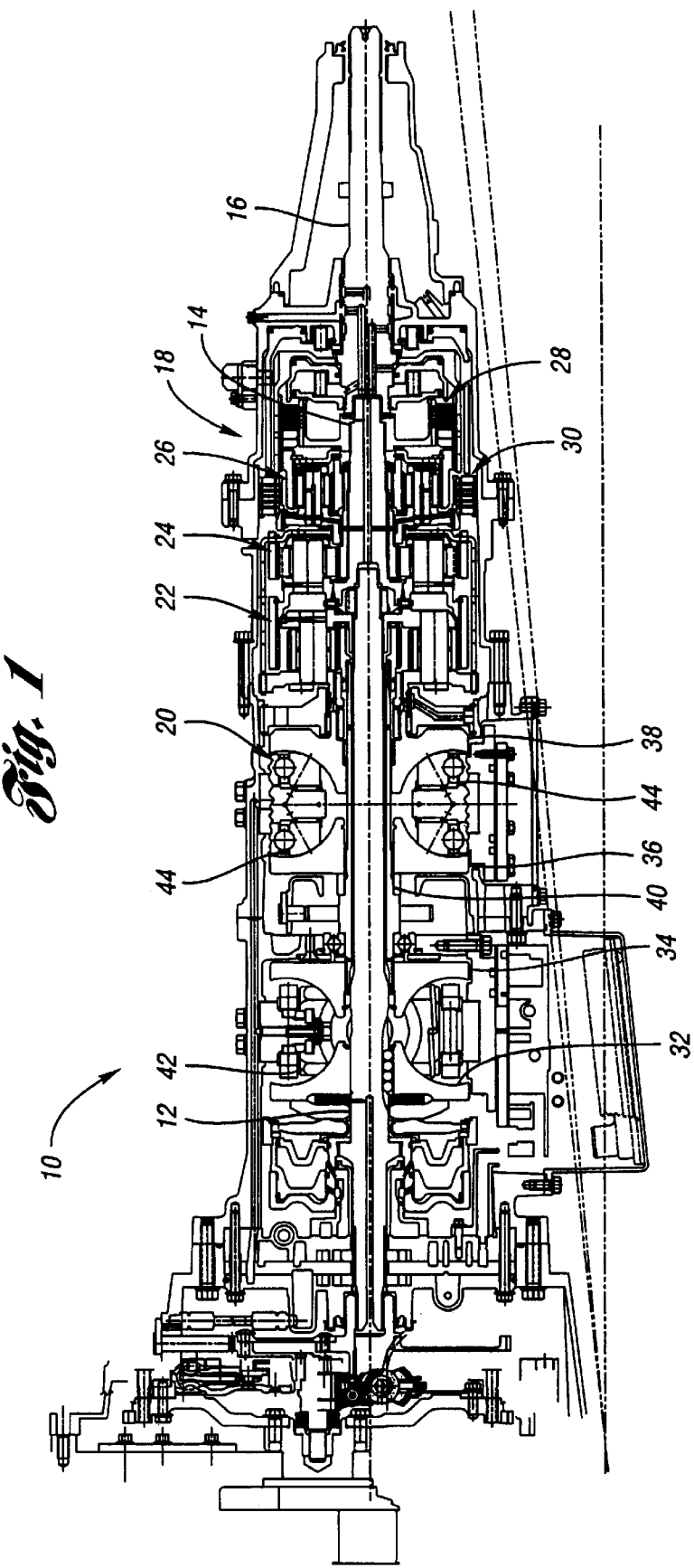
FIG. 1 is a cross-sectional side view of a transmission according to the invention.

FIG. 1 shows a traction drive transmission 10 for use with an engine (not shown). The transmission 10 includes coaxially aligned input, intermediate and output shafts 12, 14 and 16, respectively, that are disposed in a main housing 18. The transmission 10 further includes a traction drive continuously variable unit (CVU) 20; first, second, and third planetary gearsets 22, 24 and 26, respectively; and first and second or low and high clutches 28 and 30, respectively.

The CVU 20 includes first, second, third and fourth disks 32, 34, 36 and 38, respectively, and an output member such as torque shaft 40. The first disk 32 is splined or otherwise connected to the input shaft 12, and the torque shaft 40 is splined or otherwise connected to the second and third disks 34 and 36, respectively. Furthermore, the second and third disks 34 and 36 may be formed as a single disk element, or coupled together in any suitable manner to act in unison. The CVU unit 20 also includes multiple first traction members, such as first traction pinions 42, and multiple second traction members, such as second traction pinions 44. The first traction pinions 42 are configured to couple together the first and second disks 32 and 34, respectively, and the second traction pinions are configured to couple together the third and fourth disks 36 and 38, respectively. With such a configuration, the first and fourth disks 32 and 38, respectively, may be referred to as input disks of the CVU 20, and the second and third disks 34 and 36, respectively, may be referred to as output disks of the CVU 20.

A control mechanism, such as a drive ratio control mechanism (not shown), is operative to tilt or incline the traction pinions 42 and 44, thereby changing the location of contact of the traction pinions 42 and 44 on the disks 32, 34, 36, 38. As a result, the speed of the output disks 34 and 36 relative to the speed of the input 32 and 38 disks may be smoothly and continuously varied.

Figure 2:
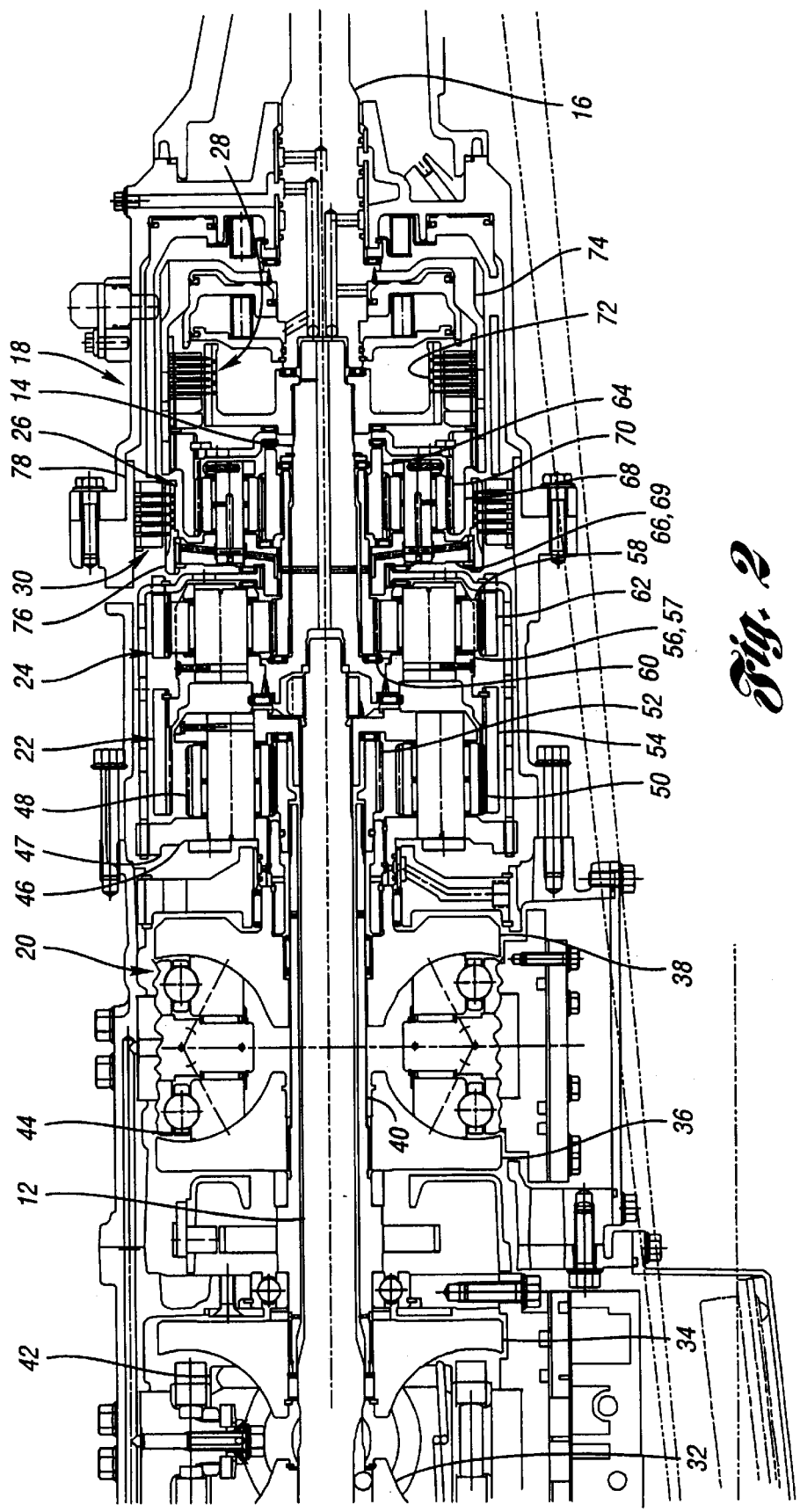
FIG. 2 is an enlarged cross-sectional side view of a portion of the transmission.

Referring to FIG. 2, the first gearset 22 is a compound planetary gearset including a first carrier 46 having a first carrier body 47 attached to the input shaft 12 and the fourth disk 38. The first carrier 46 further includes first and second planet pinions 48 and 50, respectively, rotatably supported by the first carrier body 47. The first and second planet pinions 48 and 50, respectively, may also be referred to as inner and outer planet pinions, respectively. The first gearset 22 further includes a first sun gear 52 and a first ring gear 54. The first sun gear 52 is attached to the torque shaft 40 and meshes with the first planet pinion 48. The first ring gear 54 meshes with the second planet pinion 50, which also meshes with the first planet pinion 48.

The second gearset 24 is a simple planetary gearset including a second carrier 56 having a second carrier body 57 that is attached to the first ring gear 54 and the intermediate shaft 14. The second carrier 56 also includes a second carrier pinion 58 rotatably supported by the second carrier body 57. The second gearset 24 further includes a second sun gear 60 that meshes with the second carrier pinion 58, and a second ring gear 62 that is attached to the first carrier body 47 and that also meshes with the second carrier pinion 58. Thus, the second gearset 24 has two operating members 57 and 62 that are fixedly connected to the first gearset 22.

In the embodiment shown in FIGS. 1 and 2, the third gearset 26 is a simple planetary gearset having a third sun gear 64 attached to the second sun gear 60. The third gearset 26 also includes a third carrier 66 and a third ring gear 68. The third carrier 66 includes a third carrier body 69 and a third carrier pinion 70 rotatably supported by the third carrier body 69. The third carrier pinion 70 meshes with the third sun gear 64 and the third ring gear 68.

The low clutch 28 is connected between the intermediate shaft 14 and the output shaft 16. In the embodiment shown in FIG. 2, the low clutch 28 includes a first clutch hub 72 connected to the intermediate shaft 14, and a first clutch housing 74 connected to the output shaft 16 and third ring gear 68. Furthermore, the low clutch 28 is movable between an engaged position for drivably connecting the intermediate shaft 14 and the second carrier 56 to the output shaft 16, and a disengaged position for disconnecting the intermediate shaft 14 and the second carrier 56 from the output shaft 16. When the low clutch 28 is in the engaged position, torque supplied by the input shaft 12 is transferred from the first ring gear 54, through the second carrier 56 and low clutch 28, to the output shaft 16.

The high clutch 30 is connected between the main housing 18 and the third carrier 66 and is operative to brake the third carrier body 69 so as to maintain the third carrier body 69 in a stationary position. In the embodiment shown in FIG. 2, the high clutch 30 includes a second clutch hub 76 connected to the third carrier body 69, and a second clutch housing 78 connected to the main housing 18. The high clutch 30 is movable between an engaged position for braking the third carrier body 69 and a disengaged position for releasing the third carrier body 69. When the high clutch 30 is in the engaged position and the low clutch 28 is in the disengaged position, all three gearsets 22, 24 and 26 are active. Furthermore, torque supplied by the input shaft 12 is transferred through the third sun gear 64, then through the third ring gear 68 and first clutch housing 74, to the output shaft 16.

Referring to FIGS. 1–4, operation of the transmission 10 will now be described in further detail. The input shaft 12 may be rotated continuously by the engine (not shown). For the purpose of this description, rotation of the input shaft 12 will be referred to as being in a positive direction, and any oppositely rotating element as being in a negative direction. The rotation of the input shaft 12 directly rotates the first disk 32 and the first carrier body 47, such that the first disk 32 and first carrier body 47 rotate in the positive direction. Because the first carrier body 47 is attached to the fourth disk 38, rotation of the first carrier body 47 causes the fourth disk 38 to rotate in the positive direction.

Rotating first and fourth disks 32 and 38, respectively, impinge on and rotate traction pinions 42 and 44. The traction pinions 42 and 44 then impinge on and cause the second and third disks 34 and 36, respectively, to rotate in the negative direction. The second and third disks 34 and 36, respectively, then rotate the torque shaft 40, which causes the first sun gear 52 to rotate in the negative direction.

The rotational speed of the first sun gear 52 is relative to that of the first carrier body 47. Because the first gearset 22 is a compound gearset, the speed of the first ring gear 54 will be somewhere between the speed of the first sun gear 52 and the speed of the first carrier body 47. Furthermore, the position of the traction pinions 42 and 44 may be varied so as to cause a smooth and continuous change in the speed of the output disks 34 and 36 relative to the input disks 32 and 38. This also causes smooth and continuous changes in the speeds of the first sun gear 52 and first ring gear 54. In addition, the lever proportions of the first gearset 22 are selected such that the traction pinions 42 and 44 may be positioned within an operating range to achieve zero speed for the first ring gear 54. In other words, referring to FIG. 4, when CVU pivot point 80 is below first ring gear node 82 for the first ring gear 54 (R1 in FIG. 4), which is the condition shown in FIG. 4, the first ring gear 54 will rotate in the positive direction; when the CVU pivot point 80 is at the same level as node 82, the first ring gear 54 will remain stationary; and when the CVU pivot point 80 is above node 82, the first ring gear 54 will rotate in the negative direction.

Referring to FIGS. 1–4, because the second ring gear 62 is attached to the first carrier body 47, which rotates in the positive direction, the second ring gear 62 also rotates in the positive direction. Because the second carrier body 57 is attached to the first ring gear 54, the direction of rotation of the second carrier body 57 is the same as for the first ring gear 54 and can be in the positive direction or negative direction. The intermediate shaft 14, which is connected to the second carrier body 57, also rotates in the same direction as the second carrier body 57. As shown in FIGS. 1 and 2, the second sun gear 60 is not connected to any members 46–54 of the first gearset 22. Furthermore, referring to FIG. 4, the lever proportions of the second gearset 24 are chosen such that the second sun gear 60 (S2 in FIG. 4) will always rotate in the negative direction when the input shaft 12 is rotated in the positive direction.

When the transmission 10 is operating in low mode, i.e., the low clutch 28 is engaged and the high clutch 30 is disengaged, the intermediate shaft 14 is connected to the output shaft 16 through the first clutch hub 72 and the first clutch housing 74. Thus, in low mode, the first ring gear 54, the second carrier body 57, the intermediate shaft 14, the third ring gear 70 and the output shaft 16 all rotate at the same speed. Furthermore, the rotational speed of the output shaft 16 may be positive, negative, or zero, based on the positions of the traction pinions 42 and 44. When the input shaft 12 is rotating in the positive direction and the speed of the output shaft 16 is zero, this condition is referred to as a geared neutral condition.

When the transmission 10 shifts from operating in low mode to operating in high mode, the low clutch 28 is disengaged and the high clutch 30 is engaged at a synchronous point of the transmission 10. Furthermore, the lever proportions for the first, second and third gearsets 22, 24 and 26 are preferably selected so that there is no change in output speed of the output shaft 16 during this change in operating mode. For example, tooth ratios for the gearsets 22, 24 and 26 may be as follows: R1/S1=2.92, R2/S2=3.07 and R3/S3=2.00. There is also preferably no change in position of the traction pinions 42 and 44 during the change in operating mode. Furthermore, the lever proportions may be chosen such that transition positions of the traction pinions 42 and 44 are at or proximate to first extreme positions of the traction pinions 42 and 44, in which the traction pinions 42 and 44 contact the input disks 32 and 38 at radially inner locations and contact the output disks 34 and 36 at radially outer locations.

During operation in the high mode, the position of the traction pinions 42 and 44 may be varied so as to cause a smooth and continuous increase in speed of the output shaft 16. As the traction pinions 42 and 44 move from transition positions toward second extreme positions, in which the traction pinions 42 and 44 contact the input disks 32 and 38 at radially outer locations and contact the output disks 34 and 36 at radially inner locations, the second sun gear 60 is caused to rotate with increasing speed in the negative direction. Because the third carrier body 69 is held stationary by the high clutch 30, the third ring gear 68 is driven with increasing speed in the positive direction. Because the third ring gear 68 is fixedly attached to the first clutch housing 74, which is attached to the output shaft 16, the output shaft 16 is also driven with increasing speed in the positive direction. Furthermore, the transmission 10 is operative to achieve an overdrive condition when operating in the high mode.

Because the transmission 10 does not include a Ravigneaux gearset, the transmission 10 may be easier to manufacture and assemble than prior transmissions that include a Ravigneaux gearset. Furthermore, because the gears 60 and 62 of the second gearset 24 are not connected to the gears 52 and 54 of the first gearset 22, the transmission 10 provides improved ratio flexibility. In addition, because the transmission 10 is provided with a short lever length between the second carrier 56 and the second sun gear 60, the speed differential between the second carrier body 57 and the second sun gear 60 is relatively low compared with the speed differential between a second plane sun gear and carrier of a Ravigneaux gearset. As a result, the transmission 10 may achieve lower pinion speeds for the second gearset 24 as compared with pinion speeds in the second gear plane of a Ravigneaux gearset.

Referring to FIGS. 5 and 6, a second embodiment 110 of the transmission is shown. The transmission 110 includes similar components as the transmission 10, and the similar components are identified with the same reference numbers. The transmission 110, however, includes a compound planetary third gearset 112 instead of the third gearset 26. The third gearset 112 includes a third sun gear 114 that is connected to the second sun gear 60, a third carrier 116 that is connected to the output shaft 16, and a third ring gear 118. The third carrier 116 includes a third carrier body and two third carrier planetary pinions (not shown) rotatably supported by the third carrier body. The third sun gear 114 meshes with one of the third carrier planetary pinions, and the third ring gear 118 meshes with the other of the third carrier planetary pinions.

In this embodiment, the low clutch 28 is connected between the second carrier 56 and the third carrier 116. The low clutch 28 drivably connects the second carrier body 57 with the third carrier body when the low clutch 28 is engaged, and disconnects the second carrier body 57 from the third carrier body when the low clutch 28 is disengaged.

The high clutch 30 is connected between the main housing of the transmission 110 and the third ring gear 118 and is operative to brake the third ring gear 118 so as to maintain the third ring gear 118 in a stationary position. The high clutch 30 is moveable between an engaged position for braking the third ring gear 118, and a disengaged position for releasing the third ring gear 118.

When the transmission 110 is operating in low mode, i.e., the low clutch 28 is engaged and the high clutch 30 is disengaged, torque supplied by the input shaft 12 is transferred from the first ring gear 54, through the third carrier 116, to the output shaft 16. As with the transmission 10, the transmission 110 is operative to achieve any one of positive rotational speed, negative rotational speed and zero rotational speed for the output shaft 16 when the input shaft 12 is rotating in the positive direction and the transmission 110 is operating in low mode.

When the transmission 110 is operating in high mode, i.e., the low clutch is disengaged and the high clutch 30 is engaged, torque supplied by the input shaft 12 is transferred through the third sun gear 114, then through the third carrier 116 to the output shaft 16. As with the transmission 10, the CVU 20 may be operated to increase the rotational speed of the output shaft 16 to achieve an overdrive condition when the transmission is operating in high mode.

Lever proportions for the first, second and third gearsets 22, 24 and 116 are preferably selected so that there is no change in output speed of the output shaft 16 during the change in operating mode from low mode to high mode. For example, tooth ratios for the gearsets 22, 24 and 116 may be as follows: R1/S1=2.92, R2/S2=3.07 and R3/S3=3.00.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A traction drive transmission comprising:

an input shaft;

an output shaft that is coaxial with the input shaft;

a traction drive continuously variable unit connected to the input shaft;

a first gearset including a first sun gear attached to the continuously variable unit, and a carrier having a first carrier body attached to the input shaft and the continuously variable unit, the first carrier further having first and second planet pinions rotatably supported by the first carrier body, the first planet pinion being configured to mesh with the first sun gear the second planet pinion being configured to mesh with the first planet pinion, the first gearset further including a first ring gear that meshes with the second planet pinion;

a second gearset having a second carrier attached to the first ring gear, a second ring gear attached to the first carrier body, and a second sun gear;

a third gearset having a third sun gear attached to the second sun gear, the third gearset further having a third carrier and a third ring gear;

a first clutch that is movable between an engaged position, for drivably connecting the second carrier and the third carrier, and a disengaged position for disconnecting the second carrier from the third carrier, wherein torque supplied by the input shaft is transferred from the first ring gear to the output shaft when the first clutch is in the engaged position; and a second clutch that is movable between an engaged position, for braking the third ring gear, and a disengaged position for releasing the third ring gear, wherein torque supplied by the input shaft is transferred through the third sun gear, then through the third carrier to the output shaft when the second clutch is in the engaged position and the first clutch is in the disengaged position;

wherein the transmission is operative to maintain the output shaft in a stationary position when the input shaft is rotated in a first direction and the first clutch is in the engaged position.

2. The transmission of claim 1 wherein the continuously variable unit has first, second, third and fourth disks and a torque shaft, the first disk being connected to the input shaft, the torque shaft being connected to the second and third disks, the continuously variable unit further having a first traction member for coupling together the first and second disks and a second traction member for coupling together the third and fourth disks, the first carrier body being attached to the fourth disk, and the first sun gear being attached to the torque shaft.

3. The transmission of claim 2 wherein the second and third disks are formed as a single element.

4. The transmission of claim 1 wherein the third gearset is a compound gearset, the third sun gear is connected to the second sun gear, the first clutch drivably connects the second carrier and the third carrier when the first clutch is in the engaged position, the second clutch brakes the third ring gear when the second clutch is in the engaged position, and torque supplied by the input shaft is transferred through the third sun gear, then through the third carrier to the output shaft when the second clutch is in the engaged position and the first clutch is in the disengaged position.

5. A traction drive transmission comprising:
   an input shaft;
   an output shaft that is coaxial with the input shaft;
   a traction drive continuously variable unit having first, second, third and fourth disks and a torque shaft the first disk being connected to the input shaft, the torque shaft being connected to the second and third disks, the unit further having multiple first traction members and multiple second traction members, the first traction members being configured to couple together the first and second disks, the second traction members being configured to couple together the third and fourth disks;
   a first gearset including a first sun gear attached to the torque shaft, and a first carrier having a first carrier body attached to the input shaft and the fourth disk, the first carrier further having first and second planet pinions rotatably supported by the first carrier body, the first planet pinion being configured to mesh with the first sun gear, the second planet pinion being configured to mesh with the first planet pinion, the first gearset further including a first ring gear that meshes with the second planet pinion;
   a second gearset having a second carrier attached to the first ring gear, a second ring gear attached to the first carrier body, and a second sun gear;
   a third gearset having a third sun gear attached to the second sun gear, a third carrier connected to the output shaft, and a third ring gear;
   a first clutch that is movable between an engaged position for drivably connecting the second carrier and the third carrier and a disengaged position for disconnecting the second carrier from the third carrier, wherein torque supplied by the input shaft is transferred from the first ring gear to the output shaft when the first clutch is in the engaged position; and
   a second clutch that is movable between an engaged position for braking the third ring gear and a disengaged position for releasing the third ring gear, wherein torque supplied by the input shaft is transferred through the third sun gear, then through the third carrier to the output shaft when the second clutch is in the engaged position and the first clutch is in the disengaged position;
   wherein the transmission is operative to rotate the output shaft in each of two opposite directions, as well as to maintain the output shaft in a stationary position, when the input shaft is rotated in one direction and the first clutch is in the engaged position.

6. The transmission of claim 5 wherein the second and third disks are formed as a single element.

* * * * *